(No Model.)
H. B. OSGOOD.
WHEELED VEHICLE.
No. 596,683. Patented Jan. 4, 1898.
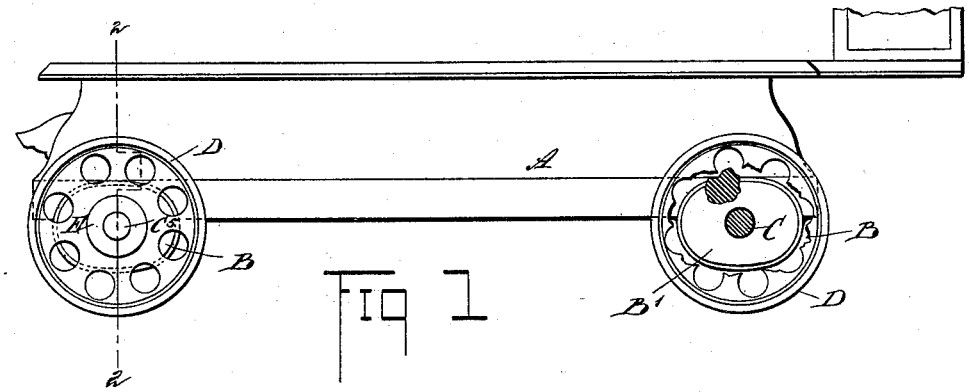
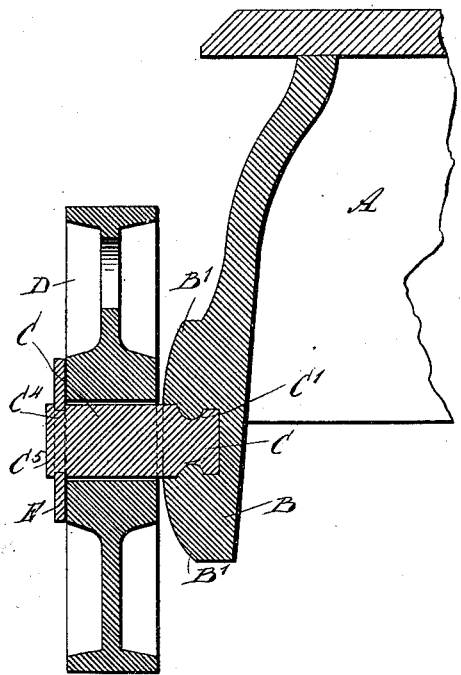
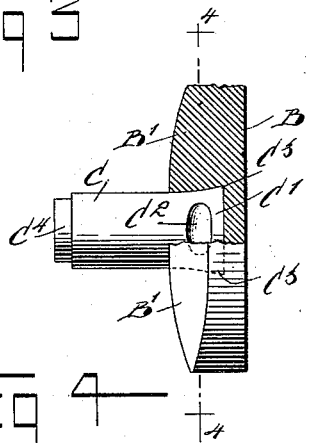
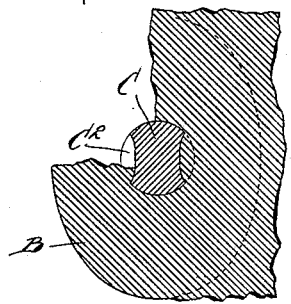
WITNESSES:
INVENTOR
H. B. Osgood.
BY
ATTORNEYS.

UNITED STATES PATENT OFFICE.

HORATIO B. OSGOOD, OF BINGHAMTON, NEW YORK.

WHEELED VEHICLE.

SPECIFICATION forming part of Letters Patent No. 596,683, dated January 4, 1898.

Application filed March 9, 1897. Serial No. 626,580. (No model.)

*To all whom it may concern:*

Be it known that I, HORATIO B. OSGOOD, of Binghamton, in the county of Broome and State of New York, have invented certain new and useful Improvements in Axles for Wheeled Vehicles, of which the following is a full, clear, and exact description.

The purpose of this invention is to provide stronger and cheaper axles for heavy vehicles, such as trucks and skids.

The invention consists in certain features of construction related to the axle and to the means for mounting them.

As an example of my invention the invention is here shown as forming part of a platform-scale.

Reference is to be had to the accompanying drawings, forming a part of this specification, in which similar characters of reference indicate corresponding parts in all the figures.

Figure 1 is a side elevation of the improvement as arranged for portable platform-scales and with parts broken out and parts in section. Fig. 2 is an enlarged transverse section of the same on line 2 2 of Fig. 1. Fig. 3 is a plan view of the axle with the lug in section, and Fig. 4 is a sectional front view of the same on the line 4 4 of Fig. 3.

When the device is applied to a platform-scale, the frame A of the scale has sides on which are cast downwardly-extending lugs B, preferably made oval and having their outer faces B' made convex, so as to extend a suitable distance outward from the sides of the frame A, as is shown in Fig. 2.

In each of the lugs B is cast the inner end C' of an iron axle C, of which the end projecting from the face B' forms the journal for the wheel D to run on. The inner end C' is formed at opposite sides with recesses or depressions $C^2$, adapted to be engaged by the metal forming the lug B when the latter is cast, so that the axle is securely held in position in the lug B. By forming the recesses $C^2$ or depressions by swaging with a suitable tool it is evident that the inner end C' becomes slightly expanded, as at $C^3$, so as to insure a secure holding of the axle in the lug B when the latter is cast, and the axle is inserted with an end C' in the mold. The extreme outer end of the axle has a reduced portion $C^4$ for the reception of a washer E, held in place by forming a rivet-head $C^5$ on the extreme end of the reduced portion $C^4$.

Now it will be seen that by the arrangement described the axle is securely held in place on the convex face B' of the lug, so as to reduce friction between the wheel-hub and the lug B to a minimum.

Having thus fully described my invention, I claim as new and desire to secure by Letters Patent—

1. A vehicle having a frame with lugs projected therefrom, the outer face of each lug being convex, and a stub-axle cast into each lug and projecting perpendicularly from the convex face thereof, said axles being capable of carrying wheels so that one side of each wheel will bear against the respective convex faces of the lugs.

2. A vehicle having a frame with lugs projected therefrom, one face of each lug being convex, and metal axles for the frame one end of each axle having a depression formed by swaging the metal axles whereby to expand said end of the axle, the said depressed and expanded ends of the axles being respectively cast into the lugs so that the axles will project perpendicularly from the convex faces of the lugs.

3. A vehicle having a frame, comprising a plurality of convex portions, and a stub-axle cast into each convex portion and projecting outward perpendicularly therefrom, the stub-axles being capable of carrying wheels so that said wheels will bear at one side against the convex portions of the frame.

HORATIO B. OSGOOD.

Witnesses:
L. A. OSGOOD,
M. A. CARY.